United States Patent
Nos et al.

(10) Patent No.: US 9,116,906 B2
(45) Date of Patent: Aug. 25, 2015

(54) CENTRALIZED READ ACCESS LOGGING

(75) Inventors: Kathrin Nos, Nussloch (DE); Iouri Loukachev, Karlsruhe (DE); Bjoern Christoph, Rheinhausen (DE); Steve Trester, Mannheim (DE); Joerg Heitmann, Heidelberg (DE); Robert Girts, Darmstadt (DE)

(73) Assignee: SAP SE, Walldorf (DE)

( * ) Notice: Subject to any disclaimer, the term of this patent is extended or adjusted under 35 U.S.C. 154(b) by 172 days.

(21) Appl. No.: 13/494,786

(22) Filed: Jun. 12, 2012

(65) Prior Publication Data

US 2013/0332424 A1 Dec. 12, 2013

(51) Int. Cl.
*G06F 17/30* (2006.01)
(52) U.S. Cl.
CPC ................. *G06F 17/30144* (2013.01)
(58) Field of Classification Search
CPC ................................................ G06F 17/30144
See application file for complete search history.

(56) References Cited

U.S. PATENT DOCUMENTS

| | | | |
|---|---|---|---|
| 6,122,740 A * | 9/2000 | Andersen | 726/4 |
| 7,043,566 B1 * | 5/2006 | Grant et al. | 719/323 |
| 7,743,029 B2 * | 6/2010 | Frey et al. | 707/648 |
| 7,840,610 B2 * | 11/2010 | Chandrasekharan et al. | 707/809 |
| 7,991,745 B2 * | 8/2011 | Bourbonnais et al. | 707/648 |
| 2003/0093576 A1 * | 5/2003 | Dettinger et al. | 709/313 |
| 2007/0162341 A1 * | 7/2007 | McConnell et al. | 705/14 |
| 2007/0168496 A1 * | 7/2007 | Bansod et al. | 709/224 |
| 2007/0174360 A1 * | 7/2007 | Yagawa | 707/204 |
| 2008/0168169 A1 * | 7/2008 | Cope | 709/224 |
| 2009/0157989 A1 * | 6/2009 | Karamcheti et al. | 711/156 |
| 2012/0239879 A1 * | 9/2012 | Kawakami et al. | 711/113 |
| 2012/0303641 A1 * | 11/2012 | Gudlavenkatasiva et al. | 707/755 |
| 2013/0227352 A1 * | 8/2013 | Kumarasamy et al. | 714/47.1 |

* cited by examiner

*Primary Examiner* — Huawen Peng
(74) *Attorney, Agent, or Firm* — Brake Hughes Bellermann LLP (57) ABSTRACT

Systems and methods are disclosed for creating a read-access log. A business application may send a request for data to a backend system using a communication protocol. At the backend system, the request may be observed and a determination made as to whether the request for data is log-relevant. The determination may be based on a log configuration record associated with the business application making the request. A record may be written in a read-access log when it is determined that the request for data is log-relevant. The log record may include information used to map entity information from the retrieved data to a semantic entity.

18 Claims, 5 Drawing Sheets

CENTRALIZED READ ACCESS LOGGING

TECHNICAL FIELD

This description relates to logging read access events.

BACKGROUND

Many organizations deal with sensitive information, such as bank account information, health care information, credit information, academic information, etc. Such organizations often work under business and legal requirements that regulate how and when such information can be accessed by employees or contractors of the organization. For example, to protect a student's privacy a university must implement rules and regulations to prevent unauthorized viewing of a student's academic information. As another example, banks may have a policy to restrict a bank teller from viewing account information without a request from the customer to do so. Such viewing access may be termed a read-access and requirements may dictate appropriate situations for an employee to view data and proscribe inappropriate situations.

To help determine whether employees, agents, or customers have followed the read-access requirements and regulations, organizations may seek to determine who accessed the data. This is often accomplished through logging. But, in a large system numerous different applications may allow read-access to the data and if one application fails to properly log the read-access events, the log becomes incomplete. Having each application perform logging introduces complexity to the system and makes changes to the logging policies and regulations difficult. Furthermore, logging can often slow the performance of an application, frustrating employees and customers alike. For example, because read-access occurs more frequently than updates, a large bank may need to process tens of millions of read-access events in a typical workday. Adding even a few extra database transactions to each read event for such systems may noticeably degrade system performance.

SUMMARY

Implementations provide a system for logging read access events. The system may include at least one processor and at least one memory. The memory may store business applications configured to request data from an interface technology using one of a number of communication protocols. The memory may also store a log configuration file. The log configuration file may include a mapping of business application entities to semantic entities. The memory may also store a number of read access hooks. The read access hooks may be configured to use the at least one processor to observe requests for data from the business applications, the requests being made over the communication protocols, and to determine whether a particular request is log-relevant based on the log configuration file. The memory may also store a log writer configured to use the at least one processor to write a record in a read-access log when it is determined that the particular request for data is log-relevant. The record in the read-access log may include information reflecting the particular request for data and a mapping of a semantic entity to a business application entity returned in response to the particular request.

In one implementation, the log configuration file may also include, for each business application entity, an indication of whether the entity is log-relevant and/or an indication of whether a value of the entity is to be included in the read-access log. In some implementations each of the number of read access hooks corresponds to a different communication protocol. In further implementations the memory may also store a log reporter configured to use the at least one processor to receive a query and generate search results from the read-access log using the semantic entity, the search results including log records from a plurality of the business applications.

In some implementations writing the record in the read access log may include extracting read event information from the particular request for data, the read event information including the semantic entity, extracting entity information from the particular request for data based on the configuration file, and writing the record, the record including the read event information and the entity information.

In another aspect, a computer-implemented method is provided that includes observing a request for data from a business application to a backend system. The request may be made over a communication protocol and observed at the backend system. The method may also include determining whether the request for data is log-relevant. The determination may be made based on a log configuration record associated with the business application. The method may further include writing a record in a read-access log when it is determined that the request for data is log-relevant.

In yet another aspect, a computer program product is provided, the computer program product being tangibly embodied on a computer-readable storage medium and comprising instructions that, when executed, are configured to cause a computer system to perform operations. The operations may include receiving a request for data from a business application at a backend system and retrieving the requested data. The operations may also include determining, at the backend system, whether the retrieved data is log-relevant based on a log configuration record associated with the business application. In some implementations, when the business application does not have an associated log configuration record the retrieved data is determined not to be log-relevant. When the retrieved data is determined to be log-relevant, the operations may further include extracting read event information from the retrieved data, extracting entity information from the retrieved data based on the configuration record, and writing the record in a read-access log that includes the read event information and the entity information. The entity information may include unstructured information for one or more entities from the request. Furthermore, the read event information may include information mapping to a semantic entity from the log configuration record.

In some implementations, the operations may also include reading the record from the read-access log and applying the read event information to the unstructured information to generate a number of items accessed. The operations may also include creating a consolidated log record for each of the number of items accessed. In further implementations the operations may include receiving a query and generating search results from the read-access log using the semantic entity. The search results may include log records from a plurality of business applications.

The details of one or more implementations are set forth in the accompanying drawings and the description below. Other features will be apparent from the description and drawings, and from the claims.

DETAILED DESCRIPTION

Systems and methods consistent with disclosed implementations provide a centralized point for logging read-access events for sensitive application data in a manner that minimizes system responsiveness and complexity. In some implementations each application that accesses sensitive data has an associated log configuration file or records within one log configuration file. The log configuration file allows application administrators and developers to indicate what fields, or entities, from the application are log-relevant and should be logged when retrieved for viewing without having to write and maintain source code or functions in the applications themselves to perform the logging. The log configuration file may include a semantic mapping so that the same entities from various applications, which may use different identifiers in the different applications, can be tied together in a read-access log reporting and/or query framework. Thus, the semantic mapping may allow the system to tie read-access events for like-entities from disparate applications together, enabling cross-application and cross-platform querying from one log.

To accomplish the read-access logging, some implementations may include a module in a technology layer, or back-end system, that observes requests for data from the business applications, uses the log configuration file or files to determine whether the access event needs to be logged and what information to log, and writes a log record, if needed. This module may also be referred to as a hook. Thus, in some implementations the hook performs the logging based on the log configuration files, rather than having each application perform logging. This ensures that each application logs read-access events correctly, in a centralized manner, thereby increasing the log consistency and decreasing the incidents of log errors. Using the hooks and log configuration files also allows real-time changes to logging policies, because no programs need to be modified and recompiled to change what data is logged, thus decreasing overall maintenance and configuration costs for the system.

Some implementations may also include a log consolidator that performs a two-step logging process that minimizes the number of database operations needed to write a log record at the time of the read-access event, thus reducing system lag time. In a two-step logging process, the hook may create one temporary log record for each read-access event by a user, no matter how many different entities, such as bank accounts or student records, were returned in response to the request event. At a later time, a log consolidator may read the temporary records and create a consolidated log from the temporary records that facilitates reporting by entity. The consolidated log may contain many records per read-access event so that querying is fast. This allows requested data at read-access time to be returned quickly to the user while still enabling powerful audit and fraud reporting. Furthermore, the consolidated log may be transferred to an external reporting system, such as a Business Information Warehouse, or a High-Performance Analytics system, and combined with logs from multiple systems to enable organization-wide reporting. Use of the semantic mapping may facilitate cross-system reporting in such external systems.

Figure 1:
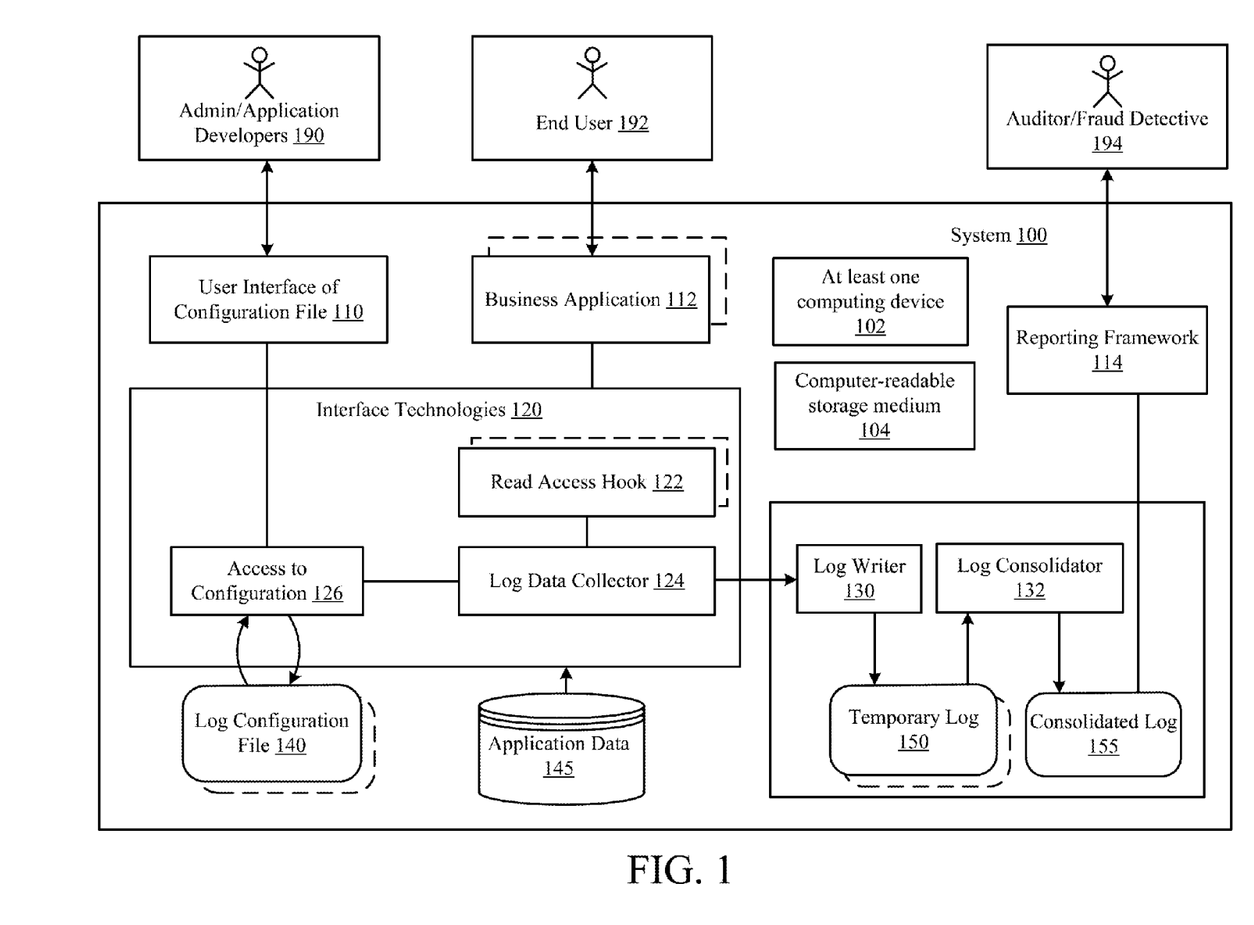
FIG. 1 is a block diagram of a system for centralized read access logging.

FIG. 1 is a block diagram of a system 100 for controlling and performing read-access logging of application data. In the example of FIG. 1, multiple business applications 112 may run in the system environment. A business application 112 may provide a user interface (UI) through which an end user 192 interacts with system 100 and may also provide business logic to support the UI. For example, business applications 112 may include applications that display account information, account number lists, or personal information for customers, students, employees, suppliers, etc. Business applications 112 may also include value help applications that assist the end user 192 in entering information into a field, such as an auto-complete or search that displays all values that match a pattern entered by the end user 192. To implement the business logic, the business applications 112 may have support from interface technologies 120. For example, business application 112 may make requests for application data 145 through interface technologies 120. The centralized interface technologies 120 insulate the business applications 112 from changes to the underlying data and data structures that the business applications 112 rely on. Interface technologies 120 may also enable the business applications 112 to run on a wide variety of hardware platforms while still relying on the same underlying data. For example, the business applications 112 may use various communication protocols to make data requests of interface technologies 120 and receive the requested data. Communications protocols provide a standard format for exchanging data and may be proprietary or may be industry standards, such as the Simple Object Access Protocol (SOAP) protocol or the WebSocket protocol. Interface technologies 120 may be referred to as back-end systems because they perform processes and functions not visible to a user and enable the system to centralize these functions so they can be reused by multiple business applications.

Through the communications protocols, interface technologies 120 may be configured to receive requests from business applications and may perform functions in response to the requests. For example, interface technologies 120 may include modules (not shown) configured to retrieve application data 145 and to return the application data 145 to the requesting business application 112 through the appropriate communication protocol. As indicated above, interface technologies 120 may support multiple communications protocols to enable the system 100 to communicate with various business applications. Interface technologies 120 may also include one or more read-access hooks 122 configured to observe data access events occurring over the various communications protocols. For example, if business applications 112 communicate with interface technology 120 using one or more of a SOAP protocol, a proprietary protocol, and a WebSocket protocol, the system may include a SOAP version of a read-access hook 122, a proprietary version of a read-access hook 122, and a WebSocket version of a read-access hook 122.

Thus, read-access hook 122 may be configured to observe data access events initiated by a business application 112 using a particular communications protocol. For each event, the read access hook 122 may use a log configuration file 140 associated with the business application 112 making the request to determine whether the event should be logged and, if so, what data should be logged. In some implementations the read access hook 122 may work with a log data collector 124 to access the log configuration file 140. If the read-access hook 122 determines that the event is to be logged, the read access hook 122 may work with the log data collector 124 to log the event. In some implementations, a single temporary log 150 record is written for each read access event.

The log data collector 124 and the read-access hook 122 may be configured to use the log configuration files 140 to centrally log read-access events. As indicated above, each business application 112 may have one or more entries in a log configuration file 140 or may have its own corresponding log configuration file 140. In some implementations, not every business application 112 may have entries in a log configuration file 140 because the data accessed by the business application 112 may not need to be logged. The log configuration file 140 may be set up by system administrators and application developers 190. In the specific example of FIG. 1, the application developers may use a user interface 110 to set up the log configuration file 140 for their application 112. As will be explained in more detail below with regard to FIG. 3, the log configuration file 140 may include an indication of the business application 112 that it corresponds to, an indication of the entities in the business application 112 that are log-relevant, an indication of whether the content or value of the entities should be included in the log, and a semantic mapping of the entities to a common entity name. The semantic mapping may enable like-entities in disparate business applications to be tied together for query or reporting purposes. For example, a bank account may have a field name of "customer_account" in one business application 112, a field name of "account_number" in another business application 112, and a field name of "primary_account" in a third business application 112. Because the three fields refer to the same entity, in this example a bank account, the configuration file 140 may map the different field names from the applications to the semantic name "bank_account." Thus, through the log configuration file each of the three fields may tied to the identifier "bank_account" even though the application that requested the data access knows them as another name.

In the specific example of FIG. 1, the system 100 also includes a log writer 130, a log consolidator 132, and a reporting framework 114. The log writer 130 may be configured to write a record to temporary log 150 for each read access event identified by read-access hook 122. Writing one log record for each read-access event minimizes the processing time and number of database accesses needed to successfully write the log record. Each record in temporary log 150 may include the name of the user 192, date and time of the event, an indication of the business application 112 issuing the read-access request, and a string of unstructured logged data. In some implementations the temporary log 150 may include an identifier of the log configuration record that triggered the log writing event, and the application 112 issuing the read-access request may be identified using this log configuration record. The string of logged data may be considered unstructured because different entities and entity values from the logged data may not be parsed out and separately identified. For example, the unstructured logged data may include a number of bank account numbers returned for a user to view. Each bank account number may be considered a different entity, but all the account numbers are stored in the same log record. However, the unstructured logged data may still include delimiters separating different entities and entity values so that these various values can later be parsed. For example, the unstructured logged data may have a pre-defined delimiter between each of the account numbers to enable the log consolidator 132 to easily identify each account number.

The log consolidator 132 may be configured to read the temporary log 150, parse the information in the temporary log 150, and create a consolidated log 155 from the temporary log 150. The log consolidator 132 may run asynchronously with the log writer 130. In other words, the log consolidator 132 may run separately and independently from the log writer 130. This enables the log consolidator 132 to run at a time when the usage of system resources is lower and has less impact on response time for end users 192. The consolidated log 155 may have multiple entries per read-access event to enable each entity involved in the event to be easily identified. For example, the consolidated log 155 may have a header-item structure. The header for each event may include the user information, the timestamp information, and other information indicating how the user accessed the data. The header may be associated with one or more items. Each item may identify one log entity, for example a bank account number. For example, when a user 192 accesses a screen that displays several account numbers, the consolidated log 155 may have a header entry with the user information and other access information, and a separate item entry for each bank account. In some implementations the consolidated log item entry may include the semantic name for the entity. In some implementations the header may include an indication of the semantic name for the entities it is associated with.

System 100 may include a reporting framework 114 configured to enable an auditor or fraud detective 194 to access the consolidated log 155 for reporting and query purposes. The auditor 194 may query the consolidated log 155 for the entities a particular user accessed during a given time interval or for the users that looked at a particular entity, such as a bank account, during the time interval. Reporting framework 114 may include a user interface that allows the auditor 194 to submit queries and/or a reporting framework that produces regularly scheduled or ad-hoc reports for the auditor 194. Because log records from all of the business applications 112 are stored in the consolidated log 155, and because the entities in the log may be identified by semantic name, the reporting framework 114 is able to produce reports and query responses across applications. In other words, no matter what business application user 192 uses to view a particular entity, all read-access events for the entity may be available to auditor 194 from a single, simple query.

In some implementations, the consolidated log 155 may be created on system 100 and migrated to a remote system, such as a data warehouse or a high-performance analytics system. Because of the semantic mapping, the consolidated logs 155 of several systems may be combined at the remote system for analysis.

FIG. 1 provides example structures and associated components which may be utilized to provide the various features and functions described herein. For example, FIG. 1 includes, in addition to the various components already described, at least one computing device, including at least one processor 102, and computer readable storage medium 104. In the example, the computer readable storage medium 104 may be utilized to store instructions which, when executed by the at least one processor 102 of the at least one computing device, may be configured to provide the read-access logging system and related features and functions.

In addition, the computer readable storage medium 104 may represent virtually any appropriate computer storage device, such as computer memory, that may be utilized during operations of the read-access logging system. For example, appropriate memory may be used to store the log configuration file 140, the application data 145, the temporary log 150, and the consolidated log 155, or to store data produced during intermediate stages of operations of the read-access logging system 100. Computer readable storage medium 104 may also represent one or more mediums, and need not represent the same medium. For example, computer readable storage medium 104 may represent RAM memory, cache memory, or disk storage.

Although FIG. 1 nominally illustrates a single computing device executing the read access logging system 100, it may be appreciated from FIG. 1 and from the above description that, in fact, a plurality of computing devices, e.g., a distributed computing system, may be utilized to implement the read access logging system 100. For example, business applications 112 may be executed in a first part of such a distributed computing system, while interface technologies 120 (a backend system) may be executed elsewhere within the distributed system.

More generally, it may be appreciated that any single illustrated component in FIG. 1 may be implemented using two or more subcomponents to provide the same or similar functionality. Conversely, any two or more components illustrated in FIG. 1 may be combined to provide a single component which provides the same or similar functionality. In particular, as referenced above, the log configuration files 140, application data 145, and the consolidated log 155, although illustrated as stored using the at least one computing device, may in fact be stored separately from the at least one computing device. Furthermore, in some implementations only the consolidated log 155 may be written or only the temporary log 150 may be written.

Thus, FIG. 1 is illustrated and described with respect to example features and terminologies, which should be understood to be provided merely for the sake of example, and not as being at all limiting of various potential implementations of FIG. 1 which are not explicitly described herein.

Figure 2:
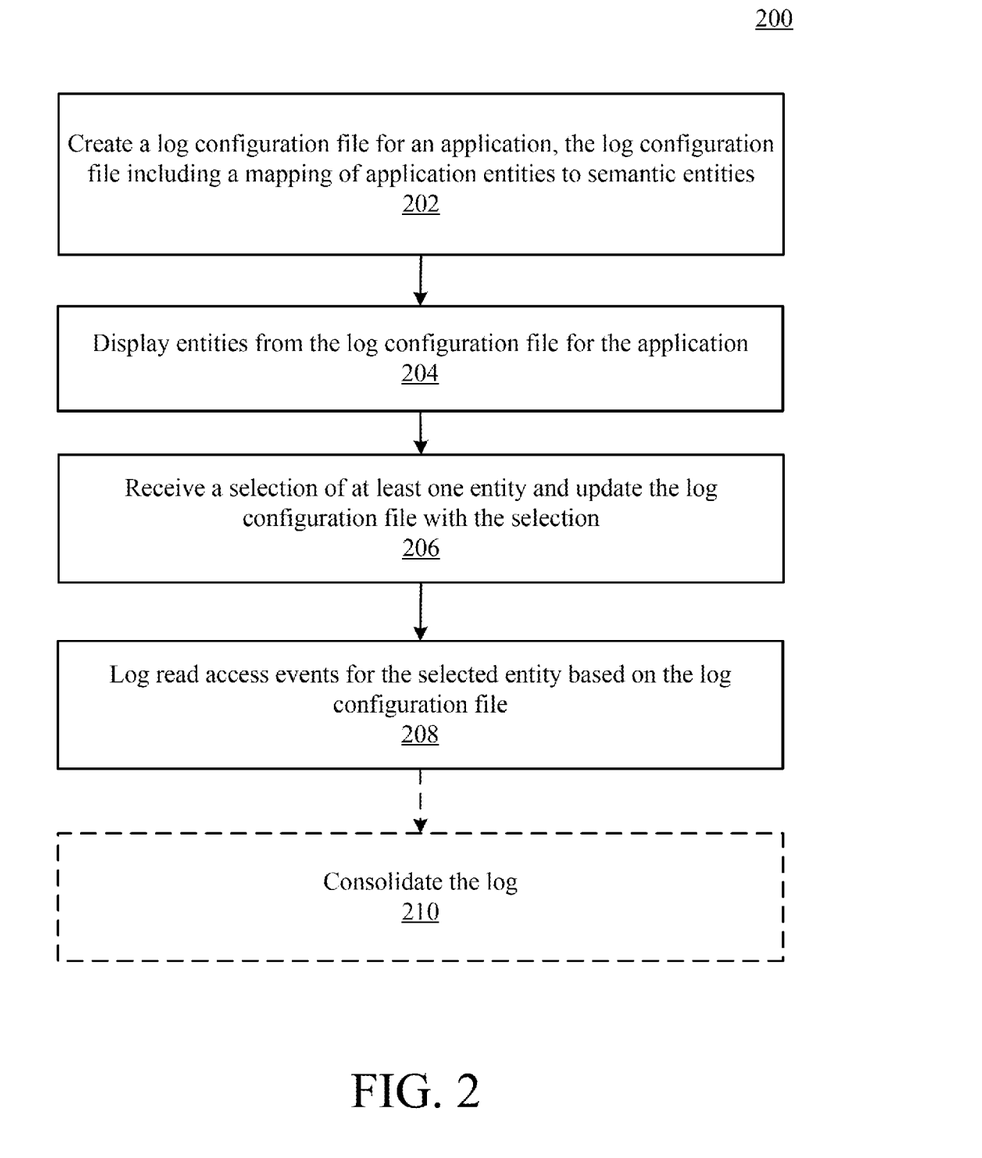
FIG. 2 is a flowchart illustrating example operations of the system of FIG. 1, consistent with disclosed implementations.

FIG. 2 is a flowchart 200 illustrating example operations of the system 100 of FIG. 1. In the example of FIG. 2, operations 202-210 are illustrated as separate, sequential operations. However, it may be appreciated that the various operations 202-210 may be executed differently than as shown and described. For example, variations of the operations 202-210 may be performed asynchronously and/or may include additional or alternative operations (not specifically illustrated). Similarly, operations may be performed in a different order than that shown, and one or more of the operations may be omitted.

In the example of FIG. 2, a read-access logging system may create a log configuration file for a business application (202). As indicated above, the read-access logging system may have one log configuration file or may have a separate file for each application. In some implementations, the log configuration file may be created based on a template created by an interface technologies developer. The template may indicate the semantic entities available in the system. In some implementations the log configuration file may be created based on semantic entities stored in a memory, such as a database or a file. The semantic entities, whether in storage or a template, may be created and maintained by a systems administrator. As previously discussed, the semantic entities enable a central point for the logging of data from various business applications without requiring that each business application use the same identifiers for the data. Thus, the semantic entities may denote the entities represented in the application data, such as application data 145, that are available to the business applications and that that should be logged. For example, entities may represent a customer, a bank account, a student, a product, an order, a transaction, a credit card, a diagnosis, a medication, etc. For each such piece of data subject to logging, the read-access logging system may have a semantic entity name to be used across all business applications and by the log reporting framework.

In order to create a log configuration file for an application, an application developer, such as developer 190 of FIG. 1, may map data fields from the business application to the semantic entities. Each field from the data application to be logged should map to a semantic entity. An application developer may accomplish the mapping through a user interface, such as the user interface 110 of FIG. 1.

Figure 3:
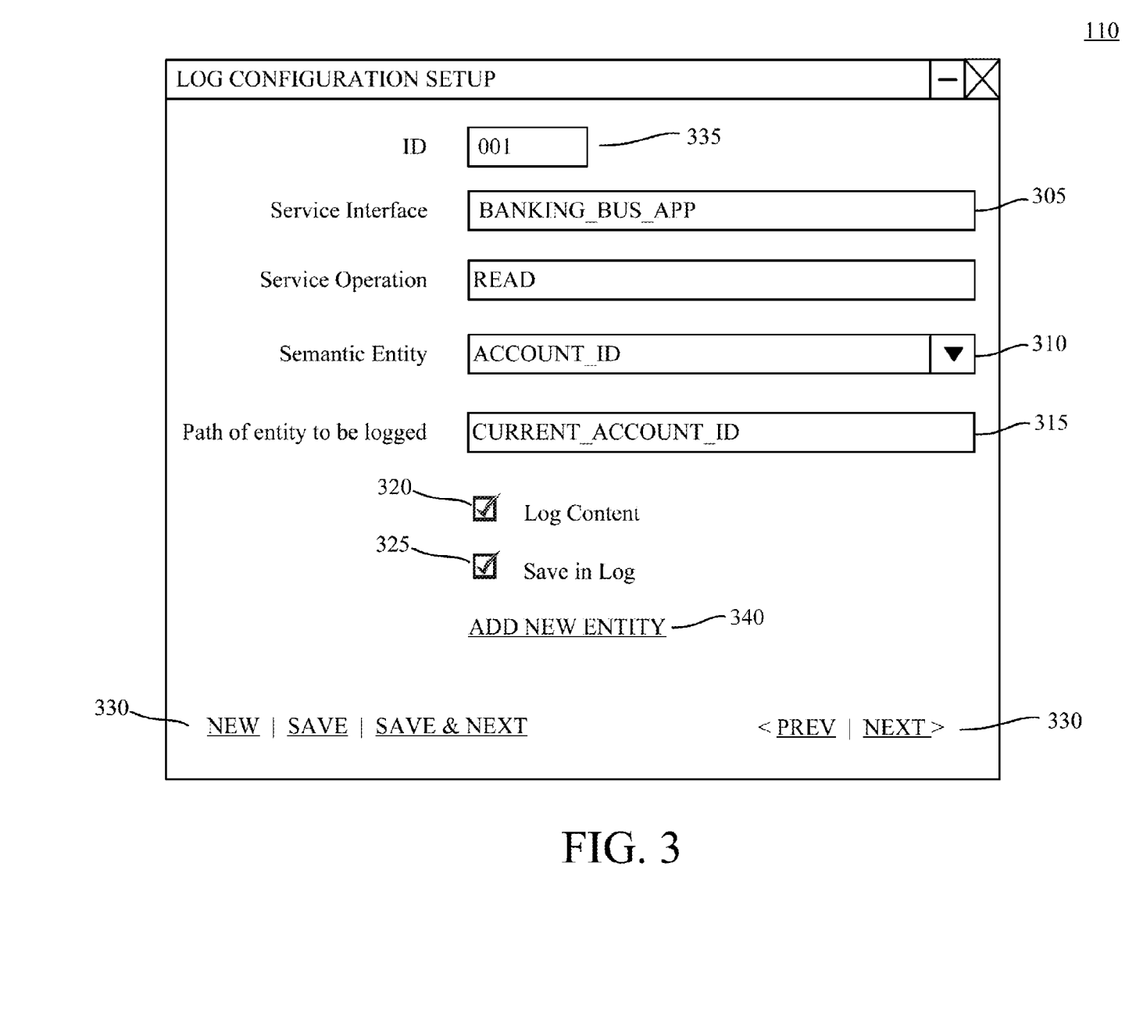
FIG. 3 is an example of a user interface for setting up an application log configuration file, consistent with disclosed implementations.

FIG. 3 illustrates an example of a user interface 110 for creating and updating the log configuration file. In the example of FIG. 3, the log configuration file user interface allows an application developer to enter an identifier for the business application 305. The identifier 305 should match an identifier used in the requests handled by the communications protocol so that the read-access hook can match a data request from the business application to entries in log configuration file. The log consolidation file may also include a numeric identifier 335 that corresponds to the identifier 305. The log configuration file user interface 110 may also enable the application developer to select a semantic entity 310 and provide a corresponding field identifier 315 from the business application. As with the business application identifier 305, the field identifier 315 should match the identifier used in requests handled by the communications protocol.

The log configuration file user interface 110 may also allow the application developer 190 to indicate whether a read access event should include the value of the entity accessed, or just indicate that the entity was accessed. In some systems, the value of an entity may not be important or must not be logged. For example, the auditors may be interested in knowing that user X displayed credit card data for customer Y, but the credit card number should not be disclosed to the auditor. To enable the log to capture the read-access event but not the value of the credit card number, the log configuration user interface may provide a checkbox 320 to indicate whether content (the value) should or should not be logged. Other indicators, such as a radio button, drop-down box, text field, etc., may be used in place of checkbox 320. When checkbox 320 is selected, the log data collector, such as log data collector 124 of FIG. 1, may store the credit card number as part of the log record. When checkbox 320 is not selected, the log data collector may log only that credit card data was accessed, but not store the actual credit card number. In such an example, the log data collector may collect context entities associated with the credit card data, such as a business partner or customer name, and include this information in the log.

Some implementations of the log configuration user interface may also allow an application developer or system administrator to turn on or off logging of a particular field or entity. For example, the log configuration file may include checkbox 325. When checked, checkbox 325 may indicate that logging for the entity is on, in other words is marked as log-relevant, and when not checked checkbox 325 may indicate that logging for the entity is off, log-irrelevant. In implementations without checkbox 325 the presence of a log configuration file entry for the entity indicates that the entity is log-relevant. The log configuration file user interface 110 may also include a link, button, or other control 340 that allows the application developer 190 to add additional entities to be logged. The log configuration file user interface 110 may also include navigation controls, such as the controls 330 of FIG. 3. While FIG. 3 provides one example of a user interface, other fields and controls may be included in the user interface. In some implementations not all fields shown in FIG. 3 may be included in the user interface.

Returning to FIG. 2, after initial creation of the log configuration file for the business application, in some implementations, the read access logging system may display the mapping to a user (204), such as a business administrator or developer, and allow the user to select one or more entities as log-relevant. For example, the user may select checkbox 325 of FIG. 3. The read access logging system may receive the selection and save the selection to the configuration file (206). Thus, the log configuration user interface may allow an administrator to dynamically control what entities get logged, what entities do not get logged, and what entities have values included in the log for each business application. In some implementations the user may only be able to mark the entity as log-relevant or not log-relevant and cannot make other changes.

Asynchronously, a user, such as user 192 of FIG. 1, may execute a business application on the read-access logging system and the read-access logging system may identify and log a read-access event from the business application based on the log configuration file (208). For example, if an entity in a banking application has been marked as log relevant in a log configuration file, the read-access log system identify a log-relevant read-access event for the entity from the banking application, determine that the event should be logged using the log configuration file, and log the event, as explained in more detail below with regard to FIG. 4. In some implementations the read-access log system may also perform a two-step logging process. In such systems, the read-access logging system may consolidate a temporary log record into one or more consolidated log records (210). The log consolidation may be performed periodically at regularly scheduled times or on-request and is explained in more detail below with regard to FIG. 5.

Figure 4:
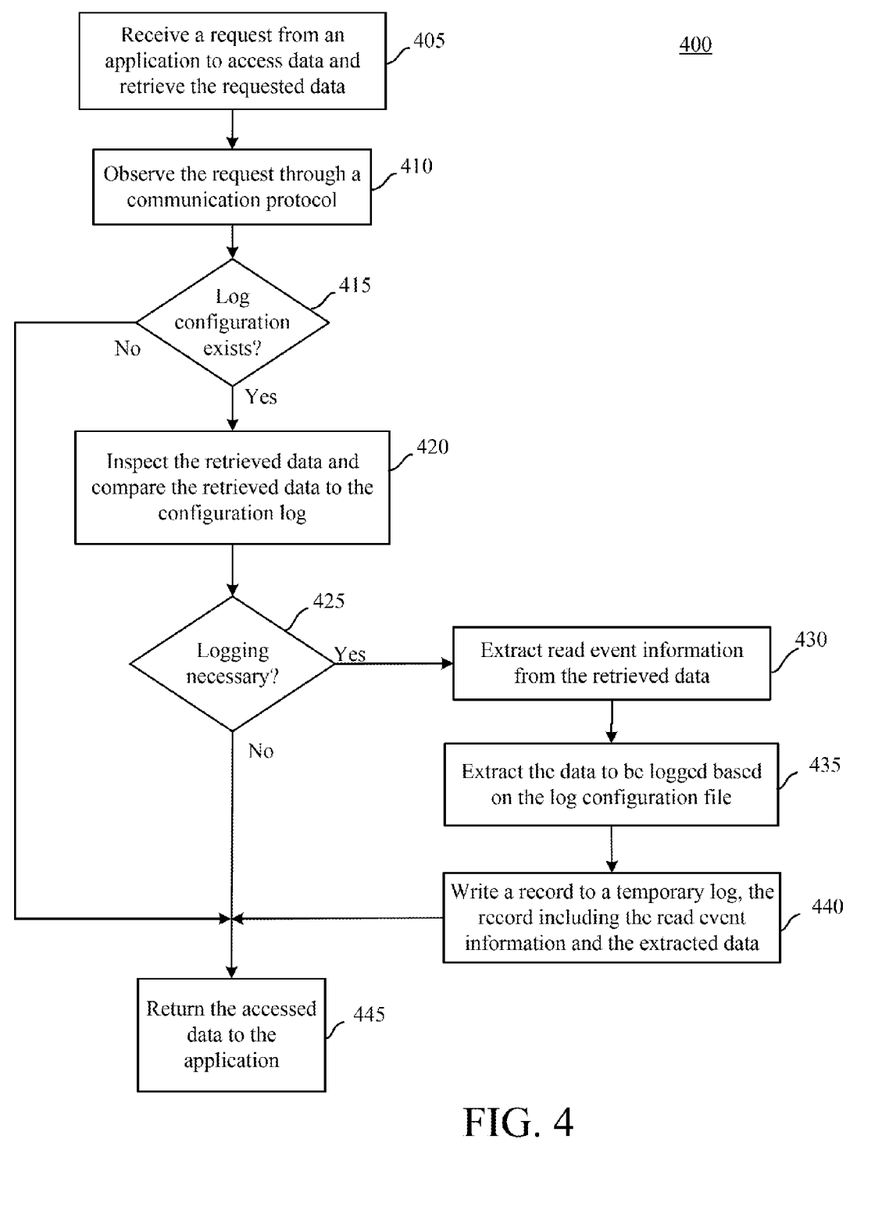
FIG. 4 is a flowchart illustrating an example process for creating a read-access log file based on the log configuration file, consistent with disclosed implementations.
Figure 5:
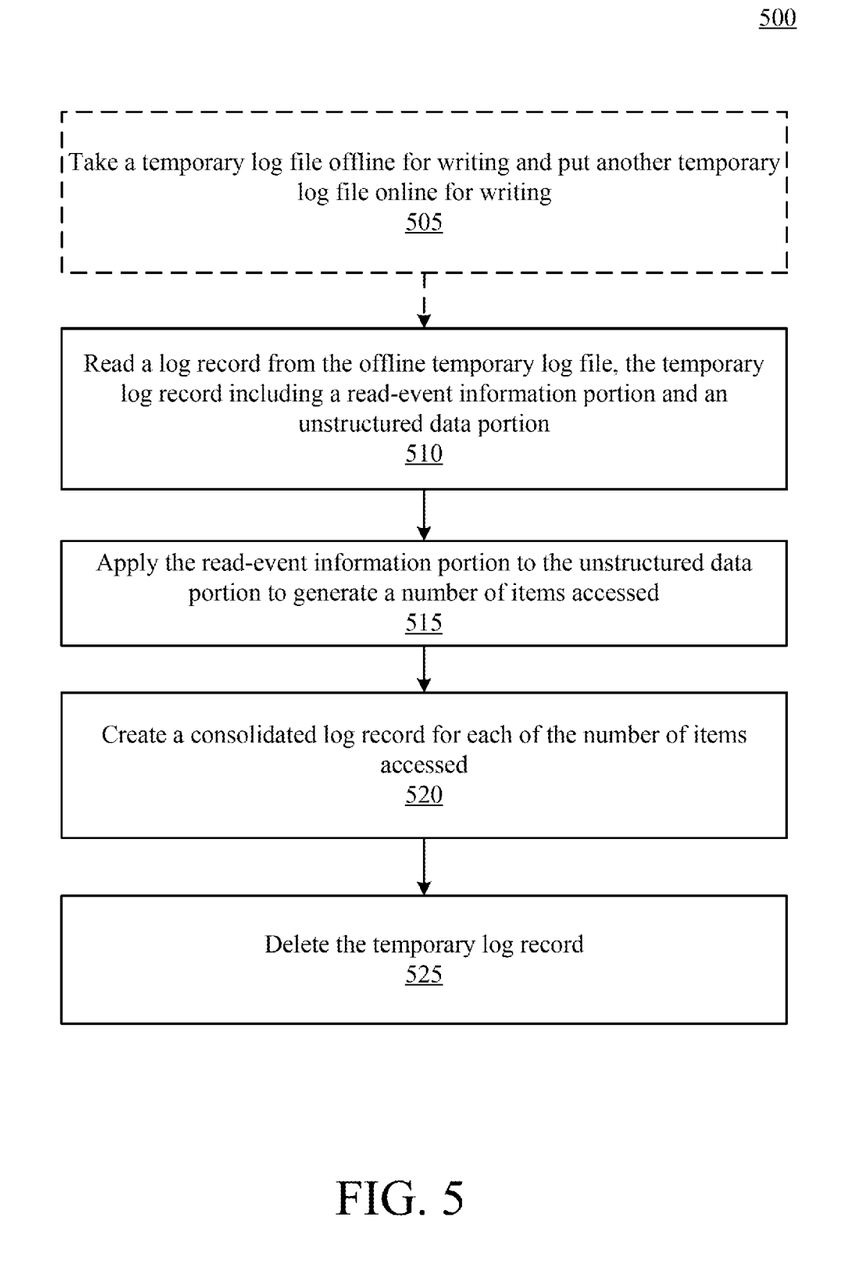
FIG. 5 is a flowchart illustrating an example process for two-step logging, consistent with disclosed implementations.

FIGS. 4 and 5, provide more detailed examples of the above-described operations of the system 100 of FIG. 1, or variations thereof. Specifically, for example, FIG. 4 is a flowchart illustrating an example process 400 for creating a read-access log file based on a log configuration file. System 100 may perform process 400 as part of step 208 of FIG. 2. For example, at a backend system, such as interface technologies 120, the system 100 may receive a request from a business application to access data and may retrieve the data from a database or other computer-readable storage (405). At interface technologies 120, a read-access hook 122 of system 100 may observe the request through a particular communications protocol (410). As explained above, the hook may be protocol-specific. The read-access hook 122 may inspect the request for an identifier of the business application and use this identifier to obtain log configuration records for the application (415). If no log configuration records exist (415, No), the system 100 will not log the read-access event and the requested data may be returned through the communications protocol with no further action (445).

If log configuration records do exist (415, Yes), the read-access hook 122 may inspect the retrieved data and compare it to data in the log configuration file to determine whether any of the retrieved data is log-relevant (420). As explained above, log-relevant data includes entities identified in the log configuration file and, in some implementations, also marked as log-relevant. If the read-access hook 122 finds that any of the data included in the retrieved data matches a log-relevant entity in the log configuration file (425, Yes), then the read-access hook 122, may extract read event information from the retrieved data (430). Read event information may include information reflecting the user who initiated the request, the date and time of the request, and the business application issuing the request, and/or the function within the business application that issued the request. In other words, the read event information reflects the who, when, and how of the data access request. In some implementations the read event information may include an identifier that identifies the log configuration file entry that matches the retrieved data so that the business application and semantic entity can be determined using the log configuration file identifier.

Read-access hook 122 may also use the log configuration file to extract log-relevant data (435). The log-relevant data may include a generic, unstructured stream of data describing entities identified in the configuration file and attributes related to the entities. For example, an account number may be identified in the log configuration file and the account number may be associated with an account-holder name and a balance as attributes. In some implementations the semantic entity name from the configuration file may be included in the log-relevant data for each entity rather than included with the read event information. In some implementations, the entity and attribute data may be extracted from the retrieved data provided to the communication protocol and concatenated in one unstructured string. In such implementations, each read access event may result in one log record. In such implementations the unstructured string may include pre-defined delimiters to assist in separating the different entities included in the log relevant data. In other implementations, the log-relevant data may be structured and split into multiple log records, with each record associated with the read event information. As indicated above, the log configuration file may indicate that the value of certain entities may not be included in the log. For example, although a read access event to a credit card number may be log relevant, the log configuration file may indicate that the number itself should not be included in the log. Therefore, as part of extracting the data to be logged and based on the log configuration file, the read-access hook 122 may remove the value for the entity or substitute the value with a generic description.

After extracting the read event information and the log relevant information, the read access hook may write one or more log records (440). As discussed above, in some implementations only one log record will be written for each read access event. This minimizes the number of databases accesses and reduces processing time. Furthermore, in some implementations, the read access hook 122 may work with a log data collector 124 and/or a log writer 130 to accomplish the creation of the log record (430-440). Whether or not a log record is written, the interface technology layer of system 100 may return the accessed data to the business application through the communication protocol (445).

FIG. 5 is a flowchart illustrating an example process 500 for a two-step logging process. System 100 may perform process 500 as part of step 210 of FIG. 2. For example, to save database accesses and processing time, system 100 may write one unstructured log record per read-access event. However, this format inhibits flexible and efficient querying of the log. To address this issue, the system 100 may provide a log consolidation process that converts the one unstructured log record into a query-friendly, structured format. For example, system 100 may include a log consolidator 132 to read temporary logs and create a consolidated log from the temporary logs. System 100 may perform process 500 at a regularly scheduled job or as an ad-hoc request at a time when demand for system resources is low. The frequency with which the system 100 performs the consolidation may depend on how often the temporary log entries are created.

In some implementations, the system 100 may take the current temporary log file offline and put another temporary log file online before starting the consolidation process (505).

This may prevent a temporary log file from being open for reading and writing at the same time. As denoted by the dashed lines, this is an optional step and the temporary log file need not be taken offline for consolidation. For example, if kept online, the log consolidator may read only records written before a given time. Thus, as used in FIG. 5, reference to an offline temporary log file may also refer to records written to an online temporary log file before a given time.

The log consolidator 132 may read a record from the temporary log (510). The temporary log file may contain a read-event information portion and an unstructured data portion. As explained above, the read-event information may reflect the who, when, and how of the read-access event and the unstructured data portion may describe entities identified in the log configuration file and attributes related to the entities. For example, the log record may be the log record written in step 440 of FIG. 4. In some implementations the entities may be identified by the semantic name from the log consolidation file rather than the name used in the application. In other implementations the read-event information portion may include the semantic name or an identifier that allows the semantic name to be determined.

The log consolidator 132 may apply the read event information portion to the unstructured data portion to generate a number of items accessed (515). The items accessed may represent individual occurrences of a particular entity. For example, a screen of a particular business application may display a list of ten bank account numbers to a user. In this example, the entity is a bank account and each bank account number may represent an item accessed, making ten items accessed. In implementations where the value of the entity is not logged, the item accessed may be the name of the bank account owner, a generic description, or some other attribute of the bank account.

The log consolidator 132 may then create one or more consolidated log records for each item accessed (520). Using the example above of a read event with ten bank accounts, the log consolidator 132 may write ten consolidated log records. The log consolidator 132 may store each consolidated log record with its associated event information. For example, in a relational database, the read event may be assigned an identifier and the read event information may be stored with the identifier. In addition, the ten items accessed may be associated with the identifier. In other implementations the event information may be stored in a record with the item information. This structure enables an auditor or other user to query the consolidated log for what accounts a particular user viewed at a particular time as well as what users accessed a given account.

In some implementations, after the log consolidator 132 has created the consolidated log record(s) from a record from the temporary log record, the log consolidator 132 may delete the temporary log record (525). Thus, in such implementations temporary log records exist only until the data they contain can be re-written into a more query-friendly consolidated log. System 100 may repeat process 500 for all records in the offline temporary log or for all records written before a specified time, etc., until all relevant temporary log records have been deleted.

In some implementations, the consolidated log records may be transferred to an external reporting system, such as a Business Information Warehouse or a High-Performance Analytics system. When a semantic name is linked to the consolidated log records for the items an auditor or other user may be able to produce reports cutting across multiple systems because the semantic name ties the same entities from different applications together.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions executable by at least one processor, the system comprising:
   the at least one processor; and
   at least one memory storing:
      a plurality of business applications, each business application configured to request data from an interface technology using one of a number of communication protocols,
      a log configuration file, wherein a record in the log configuration file identifies one of the plurality of business applications and maps a business application entity name to a semantic entity name,
      a number of read access hooks configured to use the at least one processor to:
         observe requests from the business applications for data, the requests made over the communication protocols, and
         determine that a particular request for data from a particular business application is log-relevant when at least one record in the log configuration file exists for the particular business application or exists for the particular business application and a business application entity associated with the request, and
      a log writer configured to use the at least one processor to write a record in a read-access log when the particular request for data is log-relevant, the record in the read-access log including information reflecting the particular request for data, the semantic entity name from the at least one record in the log configuration file, and a mapping of a business application entity returned in response to the particular request to a corresponding semantic entity name in the at least one record in the log configuration file.

2. The system of claim 1, wherein the log configuration file further includes, for each business application entity, an indication of whether the business application entity is log-relevant.

3. The system of claim 1, wherein the log configuration file further includes, for each business application entity, an indication of whether a value of the business application entity is to be included in the read-access log.

4. The system of claim 1, wherein each of the number of read access hooks correspond to a different communication protocol.

5. The system of claim 1, wherein writing the record in the read-access log includes:
   extracting read event information from the particular request for data, the read event information including the semantic entity name;
   extracting business application entity information from the particular request for data based on the log configuration file; and
   writing the record, the record including the read event information and the business application entity information.

6. The system of claim 5, wherein the record in the read-access log includes the read event information and the business application entity information, the business application entity information including unstructured information, retrieved in response to the particular request, for one or more business application entities.

7. The system of claim 6, wherein the at least one memory further stores a log consolidator configured to use the at least one processor to:
   read the record from the read-access log;
   apply the read event information to the unstructured information to generate a number of items accessed; and
   create a consolidated log record for each of the number of items accessed.

8. The system of claim 7, wherein the log consolidator is further configured to use the at least one processor to:
   make the read-access log unavailable for writing prior to reading the read-access log; and
   make a second read-access log available for writing.

9. The system of claim 1, wherein the at least one memory further stores a log reporter configured to use the at least one processor to:
   receive a query; and
   generate search results from the read-access log using the semantic entity, the search results including log records from a plurality of the business applications.

10. A computer-implemented method stored on a computer readable storage medium and executed by one or more processors, the method comprising:
    observing a request for data for a business application entity name from a business application to a backend system, the request made over a communication protocol and observed at the backend system;
    determining at the backend system that the request for data is log-relevant when at least one record in a log configuration file exists for the business application or exists for the business application and the business application entity name, the at least one record including a mapping of the business application entity name to a semantic entity name; and
    writing a record in a read-access log when the request for data is log-relevant, wherein the record in the read-access log includes a particular entity returned in response to the request for data and a mapping of the particular entity to the semantic entity name.

11. The method of claim 10, wherein if the business application does not have an associated log configuration record, the request for data is determined not to be log-relevant.

12. The method of claim 10, wherein the request for data is determined not to be log relevant when the log configuration file does not include the log configuration record that maps the business application entity name to a semantic entity name.

13. The method of claim 10, further comprising:
    determining read event information for the request for data;
    extracting entity information from retrieved data for the request based on the configuration record, the entity information including unstructured information for one or more entities from the retrieved data, the one or more entities including the particular entity; and
    writing the record in the read-access log, the record including the read event information and the entity information.

14. The method of claim 13, further comprising:
    reading the record from the read-access log;
    applying the read event information to the unstructured information to generate a number of items accessed; and creating a consolidated log record for each of the number of items accessed.

15. A non-transitory computer program product, the computer program product being tangibly embodied on a computer-readable storage medium and comprising instructions that, when executed, are configured to:
- receive a request for data from a business application at a backend system;
- retrieve the requested data;
- determine at the backend system that the retrieved data is log-relevant when at least one record in a log configuration file exists for the business application, wherein when no record in the log configuration file exists for the business application the retrieved data is determined not to be log-relevant; and
- when the retrieved data is determined to be log-relevant:
  - extract read event information from the retrieved data,
  - extract entity information from the retrieved data when a log configuration record for the business application and the entity exists, the entity information including unstructured information for at least one entity from the request; and
  - write the record in a read-access log that includes the read event information and the entity information, wherein the read event information includes information mapping to a semantic entity from the log configuration record for the business application and the entity.

16. The computer program product of claim 15, wherein the instructions, when executed, are further configured to:
- read the record from the read-access log;
- apply the read event information to the unstructured information to generate a number of items accessed; and
- create a consolidated log record for each of the number of items accessed.

17. The computer program product of claim 16, wherein the instructions, when executed, are further configured to:
- receive a query; and
- generate search results from the read-access log using the semantic entity, the search results including log records from a plurality of business applications.

18. The computer program product of claim 15, wherein the log configuration record includes information for mapping the at least one entity to the semantic entity.

* * * * *